United States Patent [19]

Silvis et al.

[11] Patent Number: 5,275,853
[45] Date of Patent: Jan. 4, 1994

[54] HYDROXYL FUNCTIONALIZED POLYETHERAMINES AS BARRIER PACKAGING FOR OXYGEN-SENSITIVE MATERIALS

[75] Inventors: H. Craig Silvis; Jerry E. White, both of Midland, Mich.

[73] Assignee: The Dow Chemical Company, Midland, Mich.

[21] Appl. No.: 864,975

[22] Filed: Apr. 7, 1992

Related U.S. Application Data

[63] Continuation-in-part of Ser. No. 592,097, Oct. 3, 1990, abandoned.

[51] Int. Cl.$^5$ .............. B65D 25/00; B32B 27/08; C08G 59/40; C08G 59/62
[52] U.S. Cl. .................. 428/35.4; 428/36.6; 428/36.7; 428/412; 428/413; 428/480; 428/516; 428/523; 528/97; 528/99; 528/104; 528/111; 528/118; 528/102; 528/109; 528/121; 528/124
[58] Field of Search ............. 428/36.6, 36.7, 35.4, 428/412, 413, 480, 516, 523; 528/97, 99, 104, 111, 118, 102, 109, 121, 124

[56] References Cited

U.S. PATENT DOCUMENTS

| | | | |
|---|---|---|---|
| 3,047,537 | 7/1962 | Legler | 528/118 |
| 3,317,471 | 5/1967 | Johnson et al. | 528/118 |
| 3,373,140 | 3/1968 | Aftergut | 528/99 |
| 3,377,316 | 4/1968 | Reinking et al. | 528/90 |
| 3,392,145 | 7/1968 | Garty et al. | 528/105 |
| 3,395,118 | 7/1968 | Reinking et al. | 525/523 |
| 3,395,128 | 7/1968 | Hale et al. | 528/104 |
| 3,409,592 | 11/1968 | Landua et al. | 528/124 |
| 3,507,659 | 4/1970 | Merriam et al. | 96/114 |
| 3,554,956 | 1/1971 | Jones | 528/118 |
| 3,592,946 | 7/1971 | Griffith | 528/124 |
| 4,308,085 | 12/1981 | Höerhold et al. | 156/330 |
| 4,367,299 | 1/1983 | Renner et al. | 523/457 |
| 4,383,101 | 5/1983 | Olsen et al. | 528/93 |
| 4,647,648 | 3/1987 | Silvis et al. | 528/102 |
| 4,861,810 | 8/1989 | Dewhirst | 528/104 |
| 5,006,381 | 4/1991 | Nugent, Jr. et al. | 428/35.4 |
| 5,008,137 | 4/1991 | Nugent, Jr. et al. | 428/35.4 |

FOREIGN PATENT DOCUMENTS

| | | |
|---|---|---|
| 819800 | 8/1969 | Canada . |
| 230099 | 10/1985 | European Pat. Off. . |
| 211798 | 11/1982 | German Democratic Rep. . |
| 211799 | 11/1982 | German Democratic Rep. . |

*Primary Examiner*—Frederick Krass

[57] ABSTRACT

Polyetheramines having improved barrier to oxygen are thermoplastic polymers having aromatic ether/amine repeating units in their backbones and pendant hydroxyl moieties. Such polyetheramines are prepared by reacting diglycidyl ethers of dihydric aromatic compounds such as the diglycidyl ether of bisphenol-A, hydroquinone, or resorcinol with amines having no more than two amine hydrogens per molecule, such as piperazine or ethanolamine.

14 Claims, No Drawings

HYDROXYL FUNCTIONALIZED POLYETHERAMINES AS BARRIER PACKAGING FOR OXYGEN-SENSITIVE MATERIALS

CROSS-REFERENCE TO RELATED APPLICATIONS

This is a continuation-in-part of co-pending application Ser. Number 592,097, filed Oct. 3, 1990 now abandoned.

BACKGROUND OF THE INVENTION

This invention relates to thermoplastic polyethers having pendant hydroxyl moieties and to methods of using them as barrier articles to protect oxygen-sensitive materials.

Hydroxyphenoxyether polymers are known to be useful in the fabrication of articles exhibiting barrier properties. See, for example, Reinking et al., *J. Poly. Sci.*, Vol. 7, pp. 2135–2144, pp. 2145–2152 and pp. 2153–2160 (1963) and *Encyclopedia of Polymer Science and Technology*, Vol. 10, pp. 111–122. Such polymers generally have only moderate oxygen barrier, i.e., they generally exhibit oxygen transmission rates of 2 to 75 $cm^3$-mil/100 $in^2$-atm($O_2$)-day.

In view of the limited barrier properties of the prior art polymers having pendant hydroxyl moieties and phenoxyether moieties, it would be highly desirable to provide a polymer having a high barrier (i.e., oxygen transmission rate less than 5 $cm^3$-mil/100 $in^2$-atm($O_2$)-day) to oxygen. Polymers that retain such high barrier in both dry and moist environments would be especially desirable.

SUMMARY OF THE INVENTION

The present invention is, in one aspect, a method of using a moldable, thermoplastic, hydroxy-functional polyetheramine to package oxygen sensitive materials thereby providing an oxygen barrier to protect said material from environmental oxygen. The polyetheramine has repeating units represented by the formula:

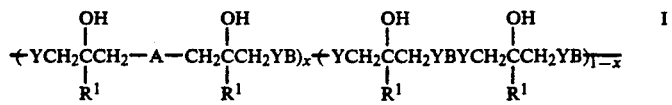

wherein each A is individually a divalent amine moiety; each B is individually a divalent aromatic moiety; each Y is divalent oxygen or sulfur, $R^1$ is hydrogen or a monovalent hydrocarbon and x is a number sufficient to reduce the oxygen permeability of the polyether to a value which is measurably lower than that of a polyether consisting of repeating units represented by the formula:

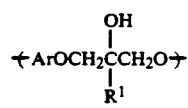

wherein Ar is the divalent radical resulting from the removal of two hydroxyl moieties from bisphenol A.

Surprisingly, the presence of the A-component in the polyetheramine results in a polymer having thermoplastic character and increased barrier to oxygen in both dry and moist environments. The polyetheramine can be extruded, molded or fabricated by other heat plastifying means to form a variety of barrier articles.

In another aspect, this invention is a novel, ultra-high barrier polyetheramine represented by the structural formula:

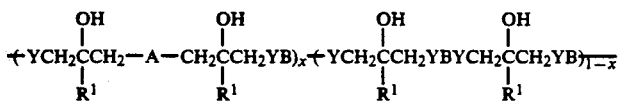

wherein B, $R^1$, Y and x are as previously defined, and each A is individually an amine moiety represented by the formula:

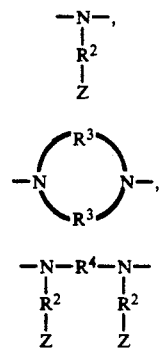

in which $R^2$ is $C_2$–$C_{10}$ hydrocarbylene; $R^3$ is a $C_2$–$C_{10}$ alkylene; $R^4$ is a $C_2$–$C_{20}$ hydrocarbylene; Z is alkylamido, hydroxy, alkoxy, alkylcarbonyl, aryloxy, arylcarbonyl, halo, or cyano.

For purposes of this invention, "hydrocarbyl" is a monovalent hydrocarbon such as alkyl, cycloalkyl, aralkyl, or aryl and "hydrocarbylene" is a divalent hydrocarbon such as alkylene, cycloalkylene, aralkylene or arylene.

In a further aspect, this invention is an article such as films, bags and tubes as well as stand-alone containers suitable for packaging oxygen-sensitive materials such as foodstuffs and medicines wherein the article is fabricated of the polyetheramine. This article can be in the form of a molded container, an impermeable film or coating, an interior or exterior layer of a laminate or a coextruded container.

In yet a further aspect, this invention is a reactive extrusion process for preparing the hydroxy-functional polyetheramine which comprises contacting a diglycidyl ether of a dihydric phenol with an amine having only two hydrogens under conditions sufficient to form the polyetheramine.

DETAILED DESCRIPTION OF THE INVENTION

In preferred embodiments of the invention, each A of the polyetheramines represented by Formula I is individually represented by one of the formulas:

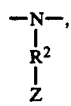

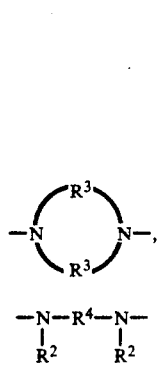

in which $R^2$ is $C_2-C_{10}$ alkylene or phenylene, with ethylene being most preferred; $R^3$ is $C_2-C_{10}$ alkylene or substituted $C_2-C_{10}$ alkylene wherein the substituent(s) is alkylamido, hydroxy, alkoxy, halo, cyano, aryloxy, alkylcarbonyl or arylcarbonyl, with ethylene being most preferred; $R^4$ is $C_2-C_{20}$ alkylene or substituted $C_2-C_{20}$ alkylene wherein the substituent(s) is alkylamido, hydroxy, alkoxy, halo, cyano, aryloxy, alkylcarbonyl or arylcarbonyl, with ethylene and p-xylylene being most preferred; Z is alkylamido, hydroxy, alkoxy, halo, aryloxy, cyano, alkylcarbonyl or arylcarbonyl, with alkylamido, hydroxy and alkoxy being most preferred. Each B is individually carbonyldiphenylene, m-phenylene, p-phenylene, sulfonyldiphenylene, isopropylidenediphenylene, biphenylene, biphenylene oxide, methylenediphenylene, biphenylene sulfide, naphthylene, biphenylenecyanomethane, 3,3'-dialkyldiphenyleneisopropylidene, 3,3',4,4'-tetraalkyldiphenyleneisopropylidene and the corresponding alkyl-substituted derivatives of the other named divalent aromatic moieties wherein the substituent(s) is a monovalent moiety which is inert in the reactions used to prepare the polyetheramine. More preferably, A is represented by the formulas:

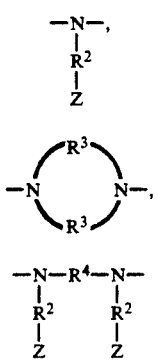

wherein each $R^2$ is individually a $C_2-C_5$ alkylene such as ethylene, propylene, butylene or pentylene; $R^3$ is a $C_2-C_5$ alkylene such as ethylene, propylene, butylene or pentylene; $R^4$ is a $C_2-C_{10}$ alkylene such as ethylene, propylene, butylene or pentylene, or arylene such as phenylene or xylylene; Z is alkylamido, hydroxy or alkoxy; B is isopropylidenediphenylene or phenylene; $R^1$ is hydrogen or methyl and x is in the range from about 0.5 to 1.0. The polyetheramines are most preferably those represented by the formula:

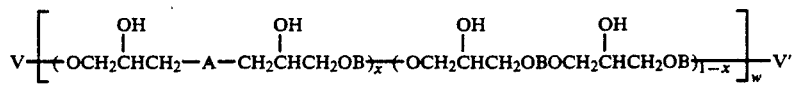

wherein A, B and x are as defined above, w is a number from 10 to 400 and each V and VI is individually a secondary amine such as

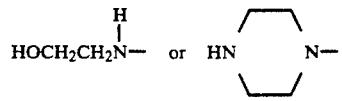

or a tertiary amine such as

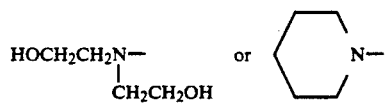

The presence of a secondary or tertiary amine endgroup, as opposed to a glycidyl endgroup, is essential in order to provide a true thermoplastic polymer that is melt-stable under processing conditions.

The polyetheramines employed in this invention are suitably prepared by contacting one or more of the diglycidyl ethers of a dihydric phenol with an amine having two amine hydrogens and represented by $AH_2$ wherein A is as previously defined under conditions sufficient to cause the amine moieties to react with epoxy moieties to form a polymer backbone having amine linkages, ether linkages and pendant hydroxyl moieties. Conditions conventionally employed in the reaction of diglycidyl ethers with amines to form amine linkages and pendant hydroxyl groups are suitably employed in preparing the resins of this invention. Examples of such suitable conditions are set forth in U.S. Pat. No. 3,317,471, which is hereby incorporated by reference in its entirety. In general, however, the process for preparing the polymers including the copolymers is carried out so that the unreacted epoxy groups in the finished polyether are minimized. By minimizing the epoxy groups in the polyetheramine, the essential thermoplastic character of the polyetheramine can be retained. Preferred conditions for preparing such resins are set forth in the following working examples.

In the preparation of copolymers (i.e., where x in the aforementioned formulae is less than one), a dihydric phenol is employed in addition to the amine. In such copolymerizations, while it is possible to subject a mixture of the diglycidyl ether(s), amine(s) and dihydric phenol(s) to copolymerization conditions, it is sometimes desirable to employ a staged addition procedure wherein the dihydric phenol is added before the amine is introduced or after essentially all of the amine has reacted with the diglycidyl ether. In the preparation of the copolymers wherein the reaction of dihydric phenol with diglycidyl ether is desired, conditions are employed to promote such reactions such as described in U.S. Pat. No. 4,647,648, which is hereby incorporated by reference in its entirety.

The diglycidyl ethers of the dihydric phenols are preferably the diglycidyl ethers of resorcinol, hydroquinone, 4,4'-isopropylidene bisphenol (bisphenol A), 4,4'-dihydroxydiphenylethylmethane, 3,3'-dihydroxydiphenyldiethylmethane, 3,4'-dihydroxydiphenylmethylpropylmethane, 4,4'-dihydroxydiphenyloxide, 4,4'-dihydroxydiphenylcyanomethane, 4,4'-dihydroxybiphenyl, 4,4'-dihydroxybenzophenone (bisphenol-K), 4,4'-dihydroxydiphenyl sulfide, 4,4'-dihydroxydiphenyl sulfone, 2,6-dihydroxynaphthalene, 1,4'-dihydroxynaphthalene, catechol, 2,2-bis(4-hydroxyphenyl)-acetamide, 2,2-bis(4-hydroxyphenyl)ethanol, 2,2-bis(4-hydroxyphenyl)-N-methylacetamide, 2,2-bis(4-hydroxy-phenyl)-N,N-dimethylacetamide, 3,5-dihydroxyphenyl-acetamide, 2,4-dihydroxyphenyl-N-(hydroxyethyl)-acetamide, and other dihydric phenols listed in U.S. Pat. Nos. 3,395,118, 4,438,254 and 4,480,082 which are hereby incorporated by reference as well as mixtures of one or more of such diglycidyl ethers. Of these preferred diglycidyl ethers, those of bisphenol-A, hydroquinone, and resorcinol are more preferred, with the diglycidyl ether of bisphenol-A being most preferred.

Examples of preferred amines include piperazine and substituted piperazines, e.g., 2-(methylamido)piperazine and dimethylpiperazine; aniline and substituted anilines, e.g., 4-(methylamido)aniline, 4-methoxyaniline, 4-tert-butylaniline, 3,4-dimethoxyaniline and 3,4-dimethylaniline; alkyl amines and substituted alkyl amines, e.g., butylamine and benzylamine; alkanol amines, e.g., 2-aminoethanol and 1-aminopropan-2-ol; and aromatic and aliphatic secondary diamines, e.g., 1,4-bis(methylamino)benzene, 1,2-bis(methylamino)ethane and N,N'-bis(2-hydroxyethyl)ethylenediamine. Of these preferred amines, 2-aminoethanol and piperazine are most preferred.

For the purposes of this invention, the term "barrier polymer" means that the polymer exhibits an oxygen transmission rate which is less than 5, preferably less than 2, most preferably less than 1, cubic centimeters-mil/100 inch$^2$-atmosphere($O_2$)-day.

The barrier articles, e.g., containers, films and coatings of this invention are fabricated from the polyetheramines using conventional fabricating techniques for normally solid, thermoplastic polymers such as extrusion, compression molding, injection molding, blow molding and similar fabrication techniques commonly employed to produce such articles.

In an especially preferred embodiment, the polyetheramine is prepared and fabricated into a shaped article by a reactive extrusion process wherein the reactants are fed into and reacted in an extruder using the conditions described in U.S. Pat. No. 4,612,156, which is hereby incorporated by reference, and is further illustrated in Example 4. In this embodiment, it is understood that one or both of the reactants may be in the form of a prepolymer or a partially advanced resin prior to feeding the reactants into the extruder.

Illustrative Embodiments

The following examples are given to illustrate the invention and should not be interpreted as limiting it in any way. Unless stated otherwise, all parts and percentages are given by weight.

EXAMPLE 1

Piperazine/Bisphenol A Polymer

To a 100 mL resin kettle flask equipped with an overhead stirrer and a nitrogen sparge are added 7.37 g (21.6 mmol) of the diglycidyl ether of bisphenol-A (4,4') which has been washed with methanol, 1.84 g (21.4 mmol) of piperazine recrystallized from diethyl ether and 6 mL of the methyl ether of dipropylene glycol (DPG). The resulting mixture is heated to about 80° C. with stirring, thereby producing a temperature exotherm to 140°–1500° C. which is accompanied by a viscosity increase of the reaction mixture. The mixture is maintained at this temperature for one hour during which the mixture is maintained stirrable by the addition of 1 mL aliquots of DPG. At this point, 0.2 mL of diethanolamine is added to cap any residual epoxide end groups. The reaction mixture is then cooled to about 25° C. and diluted with about 50 mL of dimethylformamide (DMF). The polymer product is precipitated by pouring the reaction mixture into excess methanol/water (1:1 by volume), filtered and air dried. The product is redissolved in DMF and reprecipitated in methanol/water, filtered and dried to yield 8.3 g (90%) of polymer having the following structural formula:

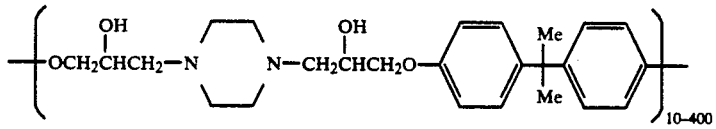

This polymer has a glass transition temperature ($T_g$) of 100° C. and an inherent viscosity of 0.85 dL/g in DMF at 25° C. The polymer is tested for barrier to the transmission of oxygen and the results are reported in Table I.

EXAMPLE 2

Generally following the procedure of Example 1, additional polyetheramines represented by the structural formula:

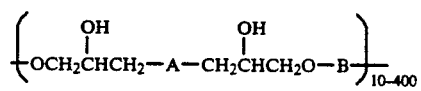

are prepared using different amines and dihydric phenols. These polyetheramines are also tested for glass transition, inherent viscosity and oxygen barrier properties and the results are reported in Tables I and II. In Sample Nos. 1–7, Component A is varied as indicated in the table and Component B is derived from bisphenol-A (i.e., diglycidyl ether of bisphenol-A). In Sample Nos. 8–11, Component A is derived from piperazine and Component B is varied as indicated in the table.

TABLE I

| Sample No. | Component A | $\eta_{inh}$[1], dL/g | $T_g$[2], °C | OTR[3], DU | RH[4], % |
|---|---|---|---|---|---|
| C (control) | —O—C₆H₄—C(Me)(Me)—C₆H₄—O— | 0.45 | 98 | 9.1 | 60–62 |
| 1 | —N(piperazine)N— | 0.85 | 100 | 1.5 | 80–90 |
| 2 | —N(2,5-dimethylpiperazine)N— | 0.55 | 99 | 3.4 | 80–90 |
| 3 | —N(4-methoxyphenyl)— | 0.46 | 86 | 4.5 | 56–57 |
| 4 | —N(CH₂CH₂OH)— | 0.57 | 80 | 0.65 | 56–57 |
| 5 | —N(CH₂CH₂OH)CH₂CH₂N(CH₂CH₂OH)— | 0.71 | 55 | 0.90 | 72–77 |
| 6 | —N(CH₂CH₂OH)CH₂—C₆H₄—CH₂N(CH₂CH₂OH)— | 0.73 | 62 | 0.59 | 78–82 |
| 7 | —N(CH₂CH₂NHC(O)Me)— | 0.55 | 82 | 0.57 | 61–63 |

[1] $\eta_{inh}$ — inherent viscosity as measured at deciliters per gram in dimethyl formamide at 25° C.
[2] Tg — glass transition temperature
[3] OTR — oxygen transmission rate measured in Dow Units, i.e., cc-mil/100 in²-atm-day
[4] RH — relative humidity of the oxygen stream

TABLE II

| Sample No. | Component B | $\eta_{inh}$[1], dL/g | $T_g$[2], °C | OTR[3], DU | RH[4], % |
|---|---|---|---|---|---|
| 8 | —C₆H₄—C(Me)(Me)—C₆H₄— | 0.85 | 98 | 1.5 | 80–90 |

TABLE II-continued

| Sample No. | Component B | $\eta_{inh}$[1], dL/g | $T_g$[2], °C. | OTR[3], DU | RH[4], % |
|---|---|---|---|---|---|
| 9 | ![meta-xylene ring] | 0.64 | 77 | 0.38 | 75–90 |
| 10 | ![benzophenone] | 2.6[1a] | 109<br>$T_m$[5] = 233 | 0.12 | 45–55 |
| 11 | ![para-phenylene] | 2.9[1a] | 86<br>$T_m$ = 246 | 0.04 | 69–77 |

[1]$\eta_{inh}$ — inherent viscosity as measured at deciliters per gram in dimethyl formamide at 25° C.
[2]$T_g$ — glass transition temperature
[3]OTR — oxygen transmission rate measured in Dow Units, i.e., cc-mil/100 in$^2$-atm-day
[4]RH — relative humidity of the oxygen stream
[5]Tm — crystalline polymer melting point
[1a]measured in hexafluoroisopropanol at 25° C.

As evidenced by comparing the Oxygen Transmission Rates (OTR) for Sample Nos. 1–7 with the OTR for Sample No. C in Table I, the inclusion of the amine Component (A) produces a surprisingly large reduction in the oxygen permeability of the polymer.

EXAMPLE 3

Using the apparatus and general procedure of Example 1, a mechanically stirred mixture of ethanolamine (1.099g, 18.0 mmol), resorcinol (1.982 g, 18.0 mmol) and bisphenol-A diglycidyl ether (12.56 g, 36.7 mmol) in 17 mL of the phenyl ether of propylene glycol is heated to 110° C. under a nitrogen atmosphere. After the reaction temperature rises exothermically to 140° C. and then cools to 130° C., ethyltriphenylphosphonium acetate (70% in methanol, 0.5 ml) is added, causing the temperature to rise exothermically to 167° C. The solution is allowed to cool to 160° C. and stirred at that temperature for 45 minutes, after which it is diluted to 75 mL with dimethylformamide. The resulting solution is poured into a 1:1 methanol/water mixture to precipitate a white solid which is collected and stirred in fresh 1:1 methanol/water for 17 hrs. The solid is collected by filtration, allowed to air dry and taken up in 100 mL of tetrahydrofuran. The resulting solution is again added to methanol/water to yield 12.79 g of solid copolymer after drying in vacuo at 60° C. for 24 hrs. The copolymer is represented by the following formula:

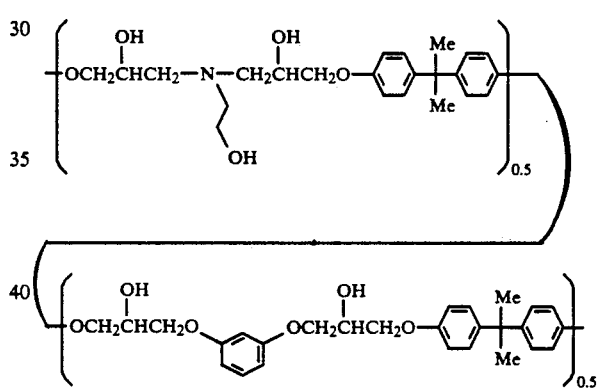

The copolymer is tested as in Example 1 and the results are reported as Sample No. 15 in Table III.

In a manner similar to the foregoing copolymerization procedure, several additional copolymers are prepared and tested and the results of those tests are reported as Sample Nos. 12–14 in Table III. These polymers are generally represented by the following structure wherein A, B and G are defined in Table III.

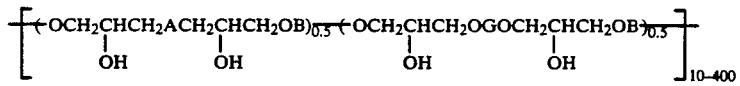

TABLE III

| Sample No. | Component A | Component B | Component G | IV, dL/g[1] | $T_g$[2], °C. | OTR[3], DU |
|---|---|---|---|---|---|---|
| 12 | —N⌒N— (piperazine) | bisphenol-A (C(CH$_3$)$_2$ bridge) | phenyl | 0.51 | 82 | 1.3 |

TABLE III-continued

| Sample No. | Component A | Component B | Component G | IV, dL/g[1] | $T_g$[2] °C | OTR[3] DU |
|---|---|---|---|---|---|---|
| 13 | NCH₂CH₂OH | bisphenol-A | bisphenol-A | 0.52 | 80 | 2.4 |
| 14 | piperazine (—N⌒N—) | bisphenol-A | NHC(CH₂)₄CNH diamide | 0.49 | 100 | 0.78 |
| 15 | NCH₂CH₂OH | bisphenol-A | phenyl | 0.48 | 75 | 1.41 |

[1] $\eta_{inh}$ — inherent viscosity as measured at deciliters per gram in dimethyl formamide at 25° C.
[2] $T_g$ — glass transition temperature.
[3] OTR — oxygen transmission rate measured in Dow Units, i.e., cc-mil/100 in²-atm-day.

EXAMPLE 4

Liquid diglycidyl ether of bisphenol-A (DER TM 332) and monoethanolamine are separately pumped at a 1.0/1.0 mole ratio into the feed zone of a 30 mm Werner-Pfleiderer twin-screw extruder operating at ≈100 rpm. The feed zone is maintained at 65° C. The other zones are heated to 180°, 180°, 185°, 185°, and 180° C. (die). Halfway down the barrel of the extruder, diethanolamine is pumped into the molten polymer at a rate of 50 g/hr in order to control molecular weight. The high molecular weight poly(amino ether) strand that exits the die is cooled in a water bath and subsequently chopped into pellets. Polymer produced in this manner demonstrate a less yellow color and better practical toughness than material of similar molecular weight produced in solution as described in Table IV:

TABLE IV

| Polymer Prepared By: | Dynatup Impact Energy[1] (at break, ft-lbs.) | Yellowness Index[2] |
|---|---|---|
| solution process | 14 (brittle/ductile) | 18.79 |
| reactive extrusion process | 84 (ductile) | 2.13 |

[1] ASTM D3763-86 using drop height of 12 inches, a drop weight of 138.5 pounds, temperature of 23° C., a tup diameter of 0.625 inches and unsupported sample area of 1.25 inches in diameter.
[2] ASTM D1925-70.

As evidenced by the data shown in Table IV, the reactive extrusion process yields a polymer having unexpectedly higher impact strength and less color than polymer made by the solution process.

What is claimed is:

1. A moldable thermoplastic polyetheramine having repeating units represented by the formula:

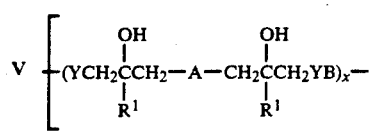

-continued

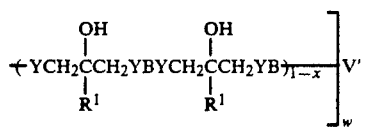

wherein each A is individually an amine or substituted amine moiety represented by the formula:

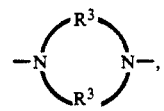

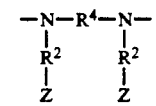

in which $R^2$ is $C_2$-$C_{10}$ hydrocarbylene; $R^3$ is a $C_2$-$C_{10}$ alkylene or inertly substituted alkylene; $R^4$ is a $C_2$-$C_{20}$ hydrocarbylene or inertly substituted hydrocarbylene; Z is alkylamido, hydroxyl, alkoxy, alkylcarbonyl, aryloxy, arylcarbonyl, halo, or cyano; each B is individually a divalent aromatic moiety; each Y is individually divalent oxygen or sulfur; $R^1$ is hydrogen or a monovalent hydrocarbon; each one of V and V' is independently a secondary amine or a tertiary amine; w is a whole number from 10 to 400; and x is a number sufficient to reduce the oxygen transmission rate of the polyetheramine to a value which is less than or equal to 5 cubic centimeters-mil/100 inch²-atmosphere (O₂)-day.

2. The polyetheramine of claim 1 wherein the secondary amine is

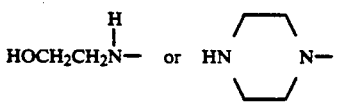

and the tertiary amine is

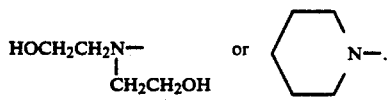

3. The polyetheramine of claim 1 wherein $R^2$ is $C_2$–$C_{10}$ alkylene or phenylene; Z is alkylamido, hydroxy, alkoxy, halo, cyano, aryloxy, alkylcarbonyl or arylcarbonyl; $R^3$ is a $C_2$–$C_{10}$ alkylene or substituted $C_2$–$C_{10}$ alkylene wherein the substituent(s) is alkylamido, hydroxy, alkoxy, halo, cyano, aryloxy, alkylcarbonyl or arylcarbonyl and $R^4$ is a $C_2$–$C_{20}$ alkylene or substituted $C_2$–$C_{20}$ alkylene wherein the substituent(s) is alkylamido, hydroxy, alkoxy, halo, cyano, aryloxy, alkylcarbonyl or arylcarbonyl.

4. The polyetheramine of claim 1 wherein $R^1$ is hydrogen or methyl, $R^2$ is alkylene, $R^3$ is ethylene, Z is hydroxyl, B is arylene or arylenealkylidenearylene, Y is divalent oxygen, and x is from 0.2 to 1.

5. The polyetheramine of claim 4 represented by the formula:

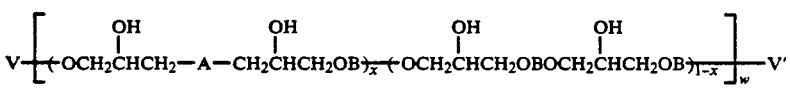

wherein each one of V and V' is independently hydroxyalkylamino, bis(hydroxyalkyl)amino, piperidinyl or piperazinyl, x is from 0.5 to 1, and w is a whole number from 10 to 400.

6. The polyetheramine of claim 1 which is the reaction product of a diglycidyl ether of a dihydric phenol and a primary amine or sec-diamine having only two amine hydrogens per molecule.

7. The polyetheramine of claim 6 wherein the dihydric phenol is bisphenol-A, hydroquinone, resorcinol or mixtures thereof and the amine is piperazine, 2-aminoethanol, 2-(2-aminoethoxy)ethanol, 1,2-bis(2-ethanolamino)ethane, 1,4-bis(2-ethanolamino)benzene, N-acetylethylenediamine, 4-(methylamido)aniline, 4-methoxyaniline, or mixtures thereof.

8. The polyetheramine of claim 6 wherein the dihydric phenol is bisphenol-A and the amine is N-acetylethylenediamine.

9. The polyetheramine of claim 6 wherein the dihydric phenol is bisphenol-A and the amine is 2-aminoethanol.

10. The polyetheramine of claim 1 which is the copolymeric reaction product of a diglycidyl ether of a dihydric phenol, a primary amine or sec-diamine having only two amine hydrogens per molecule and a dihydric phenol.

11. The polyetheramine of claim 10 which is the reaction product of (1) the diglycidyl ether of bisphenol-A, hydroquinone, resorcinol or mixtures thereof with (2) 2-ethanolamine or piperazine or mixtures thereof and (3) bisphenol-A, hydroquinone, resorcinol or mixtures thereof.

12. The polyetheramine of claim 1 in the form of a barrier container.

13. The polyetheramine of claim 1 in the form of a barrier film.

14. A process for preparing the polyetheramine of claim 1 comprising contacting a diglycidyl ether of a dihydric phenol with a primary amine or sec-diamine having only two amine hydrogens per molecule under conditions sufficient to cause the amine moieties of the amine to react with the epoxy moieties of the diglycidyl ether to form a thermoplastic polyetheramine under conditions such that the unreacted epoxy groups in said polyetheramine are minimized.

* * * * *